United States Patent [19]

Heistand, II et al.

[11] Patent Number: 4,946,810

[45] Date of Patent: Aug. 7, 1990

[54] PREPARATION OF ABO3 COMPOUNDS FROM MIXED METAL AROMATIC COORDINATION COMPLEXES

[75] Inventors: Robert H. Heistand, II, East Walpole; Lawrence G. Duquette, Maynard, both of Mass.

[73] Assignee: The Dow Chemical Company, Midland, Mich.

[21] Appl. No.: 405,335

[22] Filed: Sep. 11, 1989

Related U.S. Application Data

[62] Division of Ser. No. 88,460, Aug. 24, 1987, Pat. No. 4,880,758.

[51] Int. Cl.$^5$ .................. C04B 35/46; C04B 35/47; C04B 35/48
[52] U.S. Cl. .................................. 501/137; 501/136; 501/138; 423/598; 264/63
[58] Field of Search ............... 501/134, 135, 136, 137, 501/138, 139; 423/593, 598; 264/63

[56] References Cited

U.S. PATENT DOCUMENTS

| | | | |
|---|---|---|---|
| 4,636,248 | 1/1987 | Ogata et al. | 423/593 |
| 4,643,984 | 2/1987 | Abe et al. | 501/134 |
| 4,710,227 | 12/1987 | Harley et al. | 501/137 |
| 4,755,373 | 7/1988 | Gherardi et al. | 423/593 |
| 4,764,493 | 8/1988 | Lilley et al. | 423/598 |
| 4,778,671 | 10/1988 | Wusirika | 423/598 |
| 4,816,072 | 3/1989 | Harley et al. | 501/137 |

*Primary Examiner*—William R. Dixon, Jr.
*Assistant Examiner*—Paul Marcantoni
*Attorney, Agent, or Firm*—Hamilton, Brook, Smith & Reynolds

[57] ABSTRACT

Methods of producing ABO3 compounds in which A represents a first metal ion and B represents a second metal ion from mixed metal coordination complexes are disclosed. The methods involve reacting compounds serving as a source of the B metal ion with a substituted aromatic compound, in solution, and thereafter reacting the metal coordination complex formed with a compound serving as a source of the A metal, in solution. An example is the reaction of titanium tetraisopropoxide with catechol to form a titanium catecholate coordination complex which is thereafter reacted with barium hydroxide octahydrate to form a pentamethanol barium triscatecholatotitanate mixed metal coordination complex which can be calcined at elevated temperatures to produce the ABO3 compound, barium titanate (BaTiO3), which is known to have outstanding dielectric, ferroelectric and piezoelectric properties. Portions of the A and/or B ions can be substituted with other metals.

9 Claims, 9 Drawing Sheets

●:Ti ; ●:Ca ; ○:O

BA = (BA)
TI = (TI)
O = (hatched)
C = ○

$[BA \cdot (CH_3OH)_5][TI(CAT)_3]$

PREPARATION OF ABO₃ COMPOUNDS FROM MIXED METAL AROMATIC COORDINATION COMPLEXES

This application is a division of application Ser. No. 07/088,460, filed Aug. 24, 1987, now U.S. Pat. No. 4,880,758.

BACKGROUND OF THE INVENTION

Compounds represented by the formula ABO₃, wherein A and B represent metal ions, often have interesting optical, electronic and/or electrooptical properties arising from their crystal structure. Barium titanate (BaTiO₃), for example, has long been of interest for the preparation of dense ferroelectric bodies, thin film electronic components, piezoelectric materials, etc.

Traditionally, barium titanate has been prepared by reacting a barium compound, such as barium carbonate, with a titanium compound, such as titanium dioxide, in the solid phase at elevated temperatures, e.g., above 1000° C. Such preparation requires large amounts of grinding and milling of the barium titanate produced to achieve materials with a particle size suitable for use in most applications.

Because of the interest in barium titanate and the deficiencies of the traditional method for preparing it, there has been long and continuous research directed to finding new methods for synthesizing barium titanate and other related materials. While many of these suggested syntheses have certain merits, none has achieved consistent stoichiometric titanates in highly pure powder of small and uniform particle size.

SUMMARY OF THE INVENTION

This invention relates to the preparation of ABO₃ compounds from mixed metal aromatic coordination complexes, including substituted mixed metal aromatic coordination complexes.

Mixed metal aromatic coordination complexes according to this invention can be represented by the general formula

$[A \cdot Q_m][B(L)_n(Ar)_o]$ wherein:
A represents a first metal ion;
Q represents a solvate;
m is a number representing the moles of solvate Q;
B represents a second metal ion;
L represents oxygen or an oxygen-containing group represented by —OR wherein R can be hydrogen, saturated or unsaturated acyclic or cyclic alkyl, aryl or alkaryl;
n is a number representing the moles of L;
Ar represents a residue of a disubstituted aromatic compound; and
o is a number representing the number of moles of Ar. The sum of n times the valency of L and o times the valency of Ar is sufficient to satisfy the valency requirement to balance the net charge created by A+B.

These mixed metal aromatic coordination complexes are formed by first reacting, in solution, a compound of the metal B with a disubstituted aromatic compound. This reaction is conducted under conditions sufficient to produce a coordination complex represented by the formula $B(L)_n(Ar)_o$ wherein o is determined by the molar ratio of reactants. Thereafter, this coordination complex is reacted, in solution, with a compound of the metal A and under conditions sufficient to produce a mixed metal aromatic coordination complex represented by the formula $[A \cdot Q_m][B(L)_n(Ar)_o]$.

Q can be derived from the solvent, water of hydration of the A ion, process water or alcohol exchange with the B ion, etc. The crystal structure of $[A \cdot Q_m][B(L)_n(Ar)_o]$ determines m moles of Q which will solvate metal ion A sufficient to satisfy the coordination sphere of A. Typically m is an integer although some cases exist where it can be other than integral due to the symmetry of the lattice. The value of m may also vary due to the state of dryness of the product.

L can be derived from the source of ion B, (e.g., alkoxide), the solvent, the hydroxide or water of hydration of ion A, process water, etc.

n is dependent upon the value of o and is sufficient to provide the balance of negative charges in the complex. In some cases, n will equal zero.

Substituted mixed metal aromatic coordination complexes can be produced by this invention and are often desirable because of their unique properties. Such substituted complexes can have part of the A ion or B ion, or both, replaced with one or more different ions.

The mixed metal aromatic coordination complexes produced by the aforementioned process can be converted into ceramic powders. This can be done, for example, by calcining the mixed metal aromatic coordination complex at elevated temperatures.

The method for producing ceramic powders from the mixed metal aromatic coordination complexes described herein offers significant advantages over prior methods for producing perovskite and other ABO₃ compounds. Among the advantages offered are greater homogeneity because the reaction is carried out in solution rather than as a solid state reaction. The solution reaction also provides for high yields and control over stoichiometry and purity because the complexes are crystallized from solution. Crystallization from solution also allows control over the size and uniformity of particles produced. Additionally, the solution reaction is reproducible and allows for substitution of the A and/or B ions, in situ.

The ABO₃ compounds produced from the mixed metal aromatic coordination complexes of this invention have also been found to possess improved properties over such compounds prepared by other methods. Such properties include smaller and more uniform particle size and improved sintering at lower temperatures. Electrical components formed from sintered ABO₃ compounds produced according to this invention have been found to possess outstanding properties, such as dielectric constants and dissipation factors.

BRIEF DESCRIPTION OF THE FIGURES

The features and advantages of the invention will now be described with more detail in conjunction with the accompanying drawings. These drawings are not necessarily complete in every detail, but instead are intended to illustrate the principles of the invention.

DETAILED DESCRIPTION OF THE INVENTION

Compounds represented by the formula $ABO_3$ often fall into certain classes based upon their crystal structure and/or properties. These classes include the perovskites, ilmenites, tungsten-bronzes, complex perovskites sometimes referred to as relaxors, etc.

Figure 1:
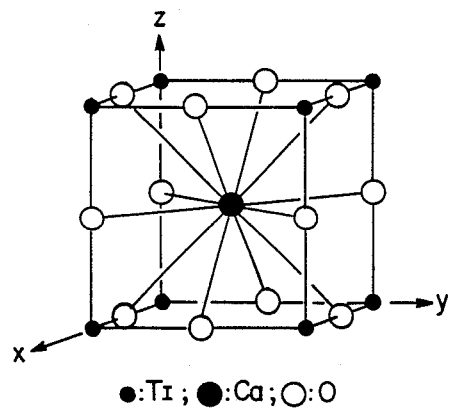
FIG. 1 is a schematic illustration of the crystal structure of a unit cell of the perovskite compound CaTiO₃.

Perovskite compounds have a structure based upon the structure of the mineral perovskite, $CaTiO_3$. A perovskite structure in idealized form has a cubic lattice. As can be seen in FIG. 1, the structure for one formula unit of $CaTiO_3$ in a unit cell contains titanium ions at the corners of the cell, a calcium ion at its center and oxygen ions at the midpoints of the cube's edges. Each Ca ion is thus 12-coordinated and each Ti ion 6-coordinated by oxygen neighbors while each oxygen is linked to four Ca and two Ti ions. Thus, the larger metal ion, calcium, occupies the position of higher coordination.

In order to have a perovskite structure, there must be certain relationships between the valences of the metals, represented by A and B in the formula $ABO_3$, and also certain relationships between the radii of the metal ions. Generally, perovskite structures require that the sum of the valences of the A and B ions be 6. The relationship between the radii of the ions can be expressed by the formula $$r_A + r_O = \frac{t}{2(r_B + r_O)}$$

wherein $r_A$, $r_B$ and $r_O$ are the radii of the A ion, B ion and oxygen ion, respectively and t is a "factor of tolerance" which may lie within the approximate limits 0.7–1.0. It is also generally true that compounds having the perovskite structure have an A ion with a radius of between about 1.0 to about 1.4 Å and a B ion with a radius of between about 0.45 to about 0.75 Å.

The ideal highly symmetrical cubic structure of perovskite ($CaTiO_3$) is found, however, in only a limited number of those compounds which have become known as perovskite compounds. At high temperatures, or when the tolerance factor is very close to unity, the simple structure does indeed often occur, but in many compounds the actual structure is a continuum of a pseudosymmetric variant of the ideal arrangement that is derived from it by small displacements of the ions. In some cases these displacements result in a slight distortion of the unit cell, the symmetry of which is accordingly reduced to tetragonal or orthorhombic, and in others the deformation is such that adjacent cells are no longer precisely identical so that the true unit cell comprises more than one of the smaller ideal units. Typically, the degree of departure from the ideal arrangement is only very slight. $BaTiO_3$, for example, has a tetragonal unit cell at room temperature with an axial ratio c/a equal to 1.01 derived from the cubic cell by an extension parallel to one of the cube edges of only 1%. Although slight, such departures from the ideal structure are often of profound importance. For instance, the ferroelectric properties of many of these oxides are due to such departures from an ideal structure. Ferroelectricity is not compatible with the high symmetry of the ideal structure, and it is only in those members of the perovskite family which have structures of lower symmetry that this property occurs.

Specific examples of perovskite compounds include, but are not limited to, the following compounds: $NaNbO_3$; $KNbO_3$; $NaWO_3$; $CaTiO_3$; $SrTiO_3$; $BaTiO_3$; $CdTiO_3$; $PbTiO_3$; $CaZrO_3$; $SrZrO_3$; $BaZrO_3$; $PbZrO_3$; $CaSnO_3$; $SrSnO_3$; $BaSnO_3$; $CaCeO_3$; $SrCeO_3$; $BaCeO_3$; $CdCeO_3$; $PbCeO_3$; $BaPrO_3$; $SrHfO_3$; $BaHfO_3$; $BaThO_3$; $YAlO_3$; $LaAlO_3$; $LaCrO_3$; $LaMnO_3$; $LaFeO_3$; $KMgF_3$; $PbMgF_3$; $KNiF_3$; and $KZnF_3$.

The ilmenite structure occurs when the A ion in an $ABO_3$ compound is too small to form the perovskite structure. For example, when the A ion radius is less than about 1.0 Å, the ilmenite arrangement sometimes occurs. This structure is closely related to that of the minerals corundum and hematite and may be described as a hexagonal close-packed array of oxygen ions with A and B ions each occupying one-third of the octahedrally coordinated interstices. Thus, both the A and B ions are 6-coordinated by oxygen neighbors.

Specific examples of compounds having the ilmenite structure include, but are not limited to: $MgTiO_3$; $MnTiO_3$; $FeTiO_3$; $CoTiO_3$; $NiTiO_3$; $LiNbO_3$; $\alpha$-$Al_2O_3$; $Ti_2O_3$; $V_2O_3$; $\alpha$-$Fe_2O_3$; $Rh_2O_3$; and $Ga_2O_3$ Some compounds have a perovskite structure in one temperature range and an ilmenite structure in other temperature ranges. $CdTiO_3$, for example, has a perovskite structure at elevated temperatures but has an ilmenite structure at lower temperatures.

Tungsten-bronzes occur in perovskite structure compounds having some of the A ion sites unoccupied. For example, sodium tungsten-bronze, $NaWO_3$, as an ideal composition is a perovskite structure. However, this compound shows very variable composition and color and can be represented better by the formula $Na_xWO_3$ wherein $1 > x > 0$. In the sodium-poor varieties, the structure remains essentially unaltered but some of the sites normally occupied by sodium are vacant. To preserve neutrality, one tungsten ion is converted from a valency of +5 to +6 for every site unoccupied, and this change in oxidation state gives rise to the characteristic alteration and color and explains its association with the sodium content.

As used herein, the formula $ABO_3$ is used to include materials in which either the A ion, the B ion, or both, are partially substituted. For example, relaxors are dielectric materials generally having higher capacitance per unit volume than most barium titanate-based perovskites. Relaxors can have either a perovskite or a tungstenbronze structure. Usually, the perovskite relaxors consist of mixed valency, multiple B ions in a fixed stoichiometry. Examples are: $Pb(Mg_{\frac{1}{3}}Nb_{\frac{2}{3}})O_3$; $Pb(Fe_{\frac{1}{2}}Zn_{\frac{1}{2}})O_3$; $Pb(Fe_{\frac{1}{2}}W_{\frac{1}{2}})O_3$; $Pb(Zn_{\frac{1}{3}}Nb_{\frac{2}{3}})O_3$. Unlike solid solution substitutions in $BaTiO_3$, the relaxor compositions contain compositional microheterogeneity. Such is the case in the Yonezawa composition [0.48 $Pb(Zn_{\frac{1}{3}}Nb_{\frac{2}{3}})O_3/0.36$ $Pb(Fe_{\frac{1}{2}}W_{\frac{1}{2}})O_3(Znl//0.16$ $Pb(Zn_{\frac{1}{3}}Nb_{\frac{2}{3}})O_3]$. An example of a relaxor tungstenbronze structure is $(Ba_{\frac{1}{2}}Sr_{\frac{1}{2}}) (Nb_{\frac{1}{2}}Ta_{\frac{1}{2}})_2O_6$.

It is also possible to substitute metals in perovskite materials, such as barium titanate, to achieve certain desired electronic properties. For example, it might be desirable to replace some of the barium ions in barium titanate with calcium and strontium and to replace some of the titanium ions with zirconium and tin ions. Such a doped material would be represented by the general formula $[Ba_{1-w-z}Sr_wCa_z][Ti_{1-x-y}Zr_xSn_y]O_3$.

For a more detailed description of $ABO_3$ compounds, see the following texts, the teachings of which are hereby incorporated by reference: Muller and Roy, "The Major Ternary Structural Families", pp. 175–201 (1974); Lines, M. E. and Glass, A. M., "Principles and Applications of Ferroelectrics and Related Materials", pp. 280–92 and Appendix F, pp. 620–32 (Clarendon Press), Oxford (1977); and Evans, R. C., "An Introduction to Crystal Chemistry", Cambridge Univ. Press., Cambridge, 2nd ed. (1964), pp. 167–71.

As discussed above, the mixed metal aromatic coordination complexes prepared according to this invention can be represented by the general formula $[A \cdot Q_m][B(L)_n(Ar)_o]$ wherein each of these letters has the meaning described herein. In this general formula, A represents the first metal ion or ions of an $ABO_3$ compound. Examples include, but are not limited to: Ba, Sr, Ca, Pb, Tb, Dy, Ho, Er, Tm, Yb, Lu and Sc ions.

B represents the second metal ion or ions of an $ABO_3$ compound. Examples include, but are not limited to: Ti, Zr, Sn, Mn, Fe, Zn, Nb, W, Mg, Ta, Cu, Cr, Ru, Rh, Co, Hf, V, Sc, Mo and Ir ions.

As is described in more detail below, a portion or portions of either the A or B ions, or both, can be substituted with additional metal ions. Examples of such substituted $ABO_3$ compounds include, but are not limited to: $[Ba_{0.8}Sr_{0.2}][Ti_{0.9}Zr_{0.1}]O_3$; $[Ba_{0.85}Sr_{0.15}][Ti_{0.93}Zr_{0.06}Sn_{0.01}]O_3$; and $[Ba_{0.77}Sr_{0.17}Ca_{0.06}][Ti_{0.98}Zr_{0.02}]O_3$.

Q represents a solvate bound to the A metal ion in these complexes. The solvate can originate from the solvents employed in the synthesis of these complexes or from other sources. Suitable solvents include water, alcohols and ethers, such as Dowanol ® brand glycol ethers marketed by The Dow Chemical Company, Midland, Mich.

L represents oxygen or an oxygen-containing group represented by the formula —OR wherein R can be hydrogen, saturated or unsaturated acyclic or cyclic alkyl, aryl or alkaryl. Examples of suitable alkyls, for example, include methyl, ethyl, isopropyl, butyl, etc. These alkyls can be substituted or unsubstituted; can be linear, branched or cyclic. Suitable aryls include phenyl, benzyl, cresol and the aryl groups can be substituted or unsubstituted.

Ar represents a residue of a disubstituted aromatic compound. Suitable compounds include disubstituted phenyl and naphthyl and fused ring compounds. In phenyl and naphthyl compounds, the disubstitution must be in the ortho position. In the case of fused rings, the disubstitution can occur in either the peri or ortho positions so that fused rings can be incorporated in the complexes. The disubstituted aromatic compounds can be substituted with hydroxyl, carboxyl, amino, thiol, etc. Examples of suitable disubstituted aromatic compounds include, but are not limited to: catechol; salicylic acid; phthalic acid; phthalic anhydride; o-aminophenol; thiophenol; o-phenylenediamine; thiocatechol; naphthalene diol; o-aminobenzoic acid; protocatechuic acid; pyrogallol; and other substituted varieties of each.

Aromatic disubstituted compounds offer certain outstanding properties for the formation of the mixed metal coordination complexes. Catechol, for example, produces a strong chelation effect. Also, the isolated crystals of the complexes are homogeneous.

o is a number representing the number of moles of the residue of the disubstituted aromatic compound in the mixed metal coordination complex. n is a number representing the moles of L. n is dependent upon the value of o and is sufficient to provide the balance of negative charges in the mixed metal coordination complex.

These mixed metal coordination complexes can be decomposed to produce $ABO_3$ compounds. This can be done by a hydrothermal decomposition, by heating to an elevated temperature (calcining) or by other decomposition techniques. Calcination is the preferred decomposition technique.

Figure 2:
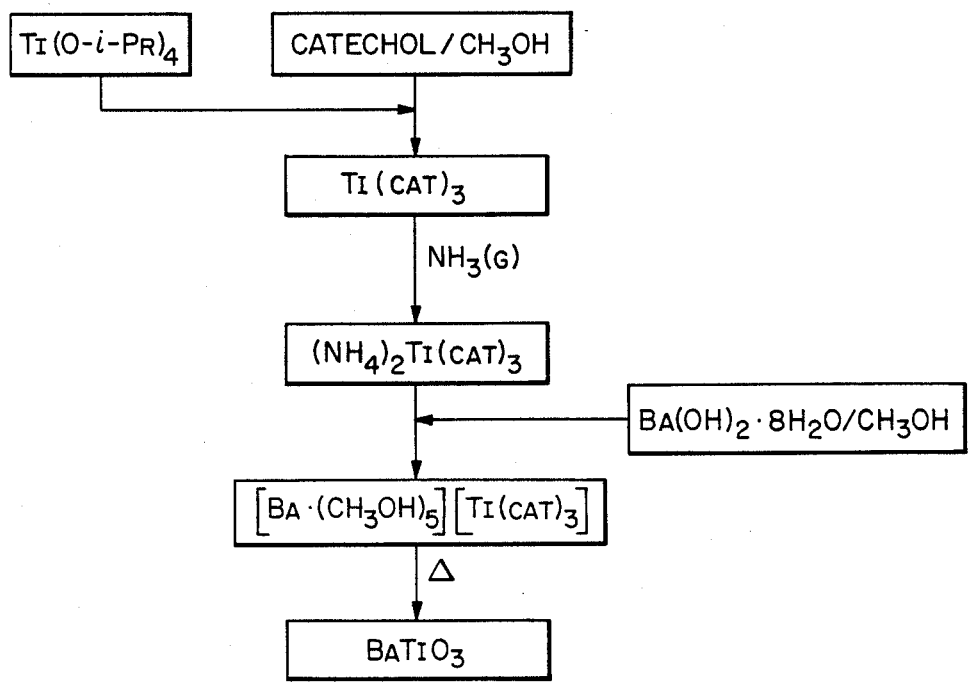
FIG. 2 is a flow diagram illustrating a process according to this invention for forming a barium titanium catecholate precursor for barium titanate and calcining this precursor to produce barium titanate powder.
Figure 2:
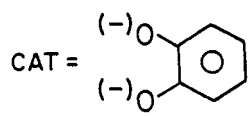
Figure 2:
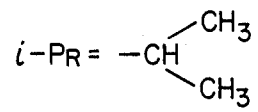

A process for preparing mixed metal coordination complexes suitable for calcination into the $ABO_3$ perovskite compound barium titanate is schematically illustrated in FIG. 2. The aromatic compound employed in this synthesis is catechol which is employed by dissolving it in an alcohol solution, such as methanol. Titanium tetraisopropoxide, a titanium alkoxide serving as a source of the B metal for the $ABO_3$ precursor, is then added to the alcohol solution of catechol. The molar ratio of the titanium compound to catechol can be varied, depending upon the desired coordination complex, but is preferably about one or less. A molar ratio of 0.33 is illustrated in FIG. 2 which results in the precipitation from solution of a titanium catecholate coordination complex containing three moles of the catecholate ion for each titanium ion.

The precipitate is redissolved by sparging anhydrous ammonia gas through the solution to raise the pH sufficiently for dissolution of the titanium catechol complex. Although other alkaline materials could be employed, ammonia gas is particularly preferred because the ammonium triscatecholatotitanate formed does not leave residual cations in the ultimate product since the ammonium ions are driven off as ammonia gas later in the reaction.

Barium hydroxide octahydrate dissolved in methanol is then added to the reaction mixture as a source of the A metal ion barium. As the reaction proceeds, pentamethanol barium triscatecholatotitanate precipitates from the solution.

The synthesis illustrated in FIG. 2 provides good stoichiometric control of the A and B ions, barium and titanium in this case. It produces a high yield of highly pure crystals suitable for calcination at elevated temperatures to barium titanate, as illustrated.

The synthesis schematically illustrated in FIG. 2 serves as the basis for the more specific examples 1–4 set forth below. Examples 5 and 6, set forth below, are specific examples employing a similar synthesis in which salicylic acid is employed instead of catechol.

Figure 3:
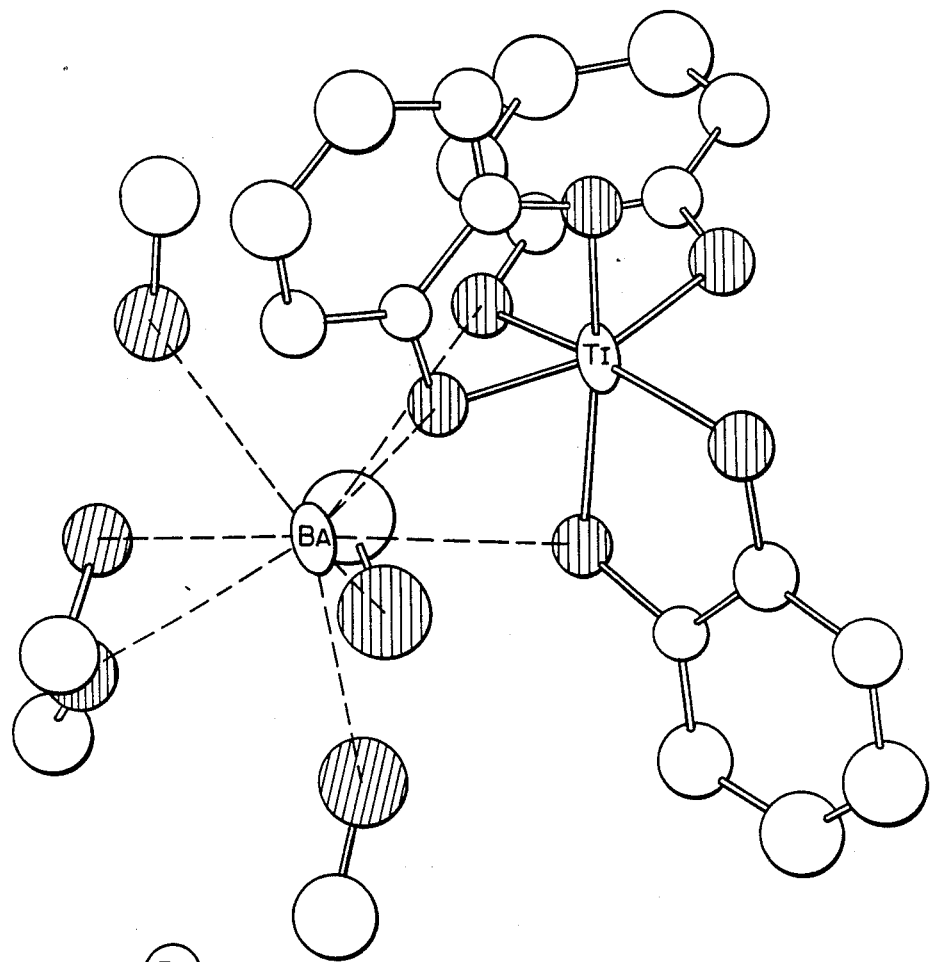
FIG. 3 is a schematic illustration of the molecular structure of the mixed metal aromatic coordination complex, pentamethanol barium triscatecholatotitanate.

The molecular structure of pentamethanol barium tricatecholatotitanate is illustrated in FIG. 3. This was determined as follows. Single crystals were grown slowly from the dilute reaction solution of a diammonium triscatecholatotitanate methanol solution with a barium hydroxide octahydrate methanol solution as illustrated in FIG. 2 and described above. Data were collected with Mo Kα radiation at room temperature on a crystal sealed with mother liquors in a capillary tube. The space group was $P2_1/n$. The cell parameters were determined to be: a=16.014(5) Å, b=12.070(4) Å, c=16.379(5) Å, $\beta$=116.93(3)°, V=2822.6 Å$^3$. Refinement of 1657 data points by full matrix least squares regression produced an $R_s$ of 0.055. The calculated density of 1.576 g/cm$^3$ agrees well with the observed density of 1.57(1) g/cm$^3$ As shown in FIG. 3, the titanium ion is chelated by three catechol anions in an octahedral environment. The barium ion shares a face of the oxygen octahedron with the titanium ion and completes its coordination sphere with five methanol solvates.

Figure 4:
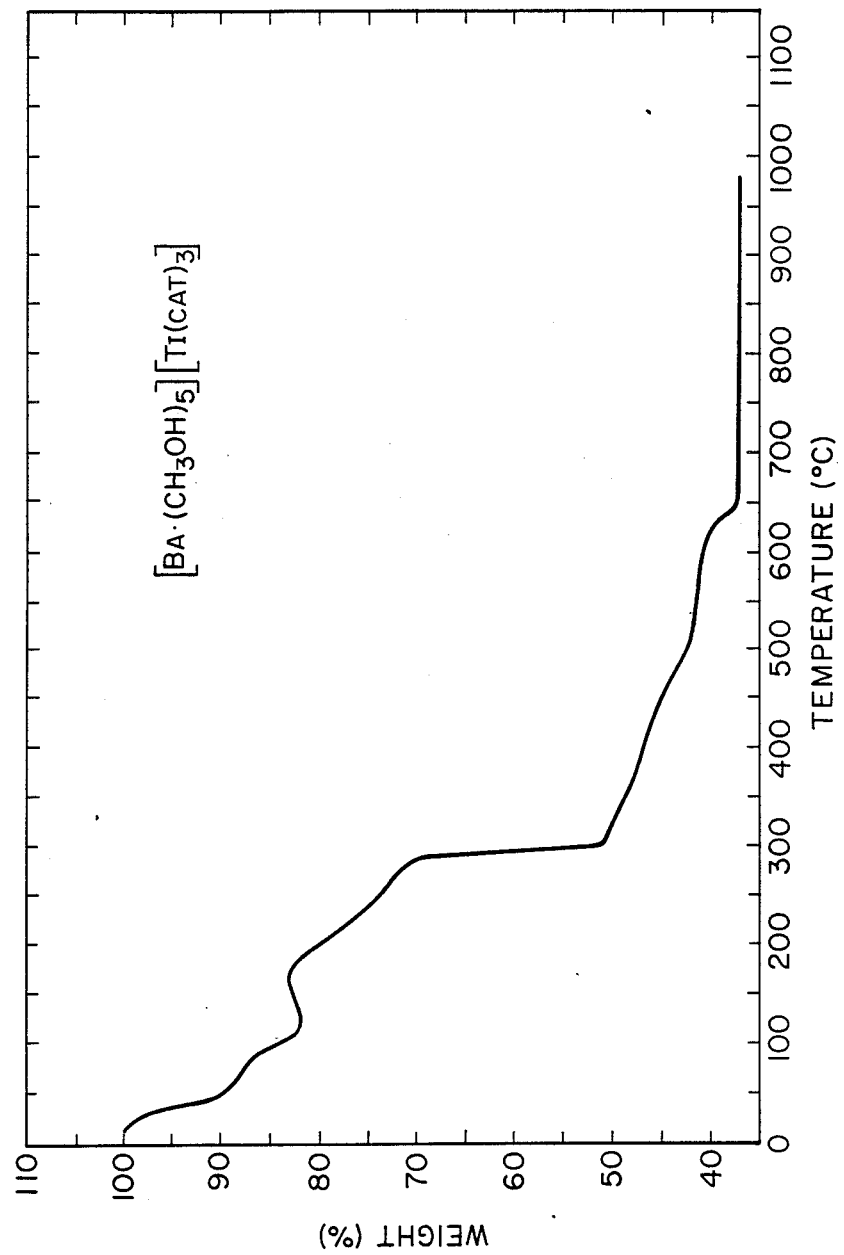
FIG. 4 is a plot resulting from thermogravimetric analysis (TGA) of pentamethanol barium triscatecholatotitanate.

FIG. 4 is a thermogravimetric analysis (TGA) plot of pentamethanol barium triscatecholatotitanate (product of Example 1). The sample was heated in air at 3° C./minute. Up to about 200° C., methanol (3.5 equivalents) was lost (18% weight change). One and one-half equivalents of methanol were lost in transferring the sample from solution to the TGA furnace. The endotherm (~3.5% weight increase) between 125° C. to 200° C. is a measure of oxygen uptake. The weight loss (~45%) between 200° C. to 650° C. can be attributed to 3 equivalents of phenol. The resultant barium titanate showed a 37.7% residue on the TGA plot.

As mentioned above, the molar ratio of titanium to catechol employed in the synthesis illustrated in FIG. 2 is 0.33. Thus, the final complex has three moles of catechol residue for each mole of barium and titanium. Disregarding the solvate, Q, the complex might be represented generally as AB(Ar)$_3$.

If the molar ratio of A and B to Ar had been 0.5, the complex which would result might be represented by the general formula AB(OR)$_2$(Ar)$_2$ or a corresponding oxo equivalent ABO(Ar)$_2$. Similarly, if the molar ratio had been one, the complex which would result might be represented by the general formula AB(OR)$_4$(Ar) or a corresponding oxo equivalent ABO(OR)$_2$(Ar). In both cases, it is believed that higher pH and an increased presence of water tend to favor formation of the oxo species.

Figure 5:
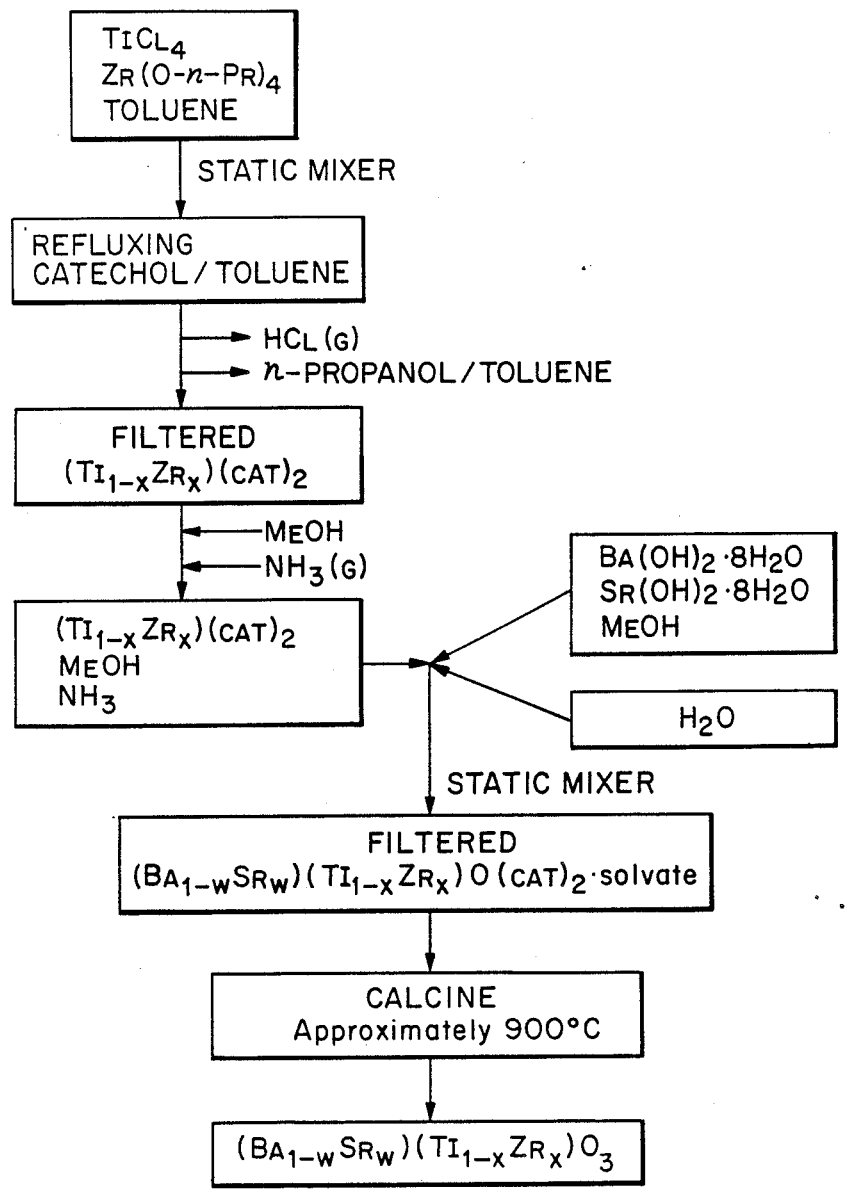
FIG. 5 is a flow diagram illustrating a process according to this invention for preparing a substituted barium titanate powder.

FIG. 5 illustrates schematically an alternative process for preparing mixed metal aromatic coordination complexes suitable as precursors for ABO$_3$ compounds. In this process, titanium tetrachloride is employed as the source of the B ion. In addition, the process illustrates the substitution of portions of the B ion, titanium, and portions of the A ion, barium. As can be seen, the substitute B metal ions are zirconium metal ions supplied from zirconium tetrapropoxide.

The titanium chloride and zirconium tetrapropoxide reactants are combined with toluene and blended together. The solution is then pumped through a static mixer into a refluxing solution of catechol dissolved in toluene. Hydrogen chloride gas is formed by chloride ions liberated from the titanium chloride and protons liberated from the catechol. When sufficient solvent (n-propanol/toluene azeotrope) has been distilled from the reaction solution to drive it to completion, the solution is filtered to obtain a precipitate of a titanium biscatecholate in which some of the titanium ions have been substituted by zirconium ions. The precise amounts of substituted ions will depend, of course, on the molar ratio of such ions to the titanium ions and crystallization mechanisms. The precipitate is then redissolved in methanol by sparging with ammonia gas to raise the pH of the solution.

A solution of barium hydroxide octahydrate and strontium hydroxide octahydrate is then prepared in methanol. The barium compound serves as a source of the A ion in the compound ABO$_3$ and the strontium salt serves as a source of the substituted ion strontium which partially replaces the barium ions in the ultimate precursor complex and ABO$_3$ compound. The methanol solution of the A ions is then pumped through a static precipitator together with the methanol solution of the ammonium oxobiscatecholatotitanate. A mixed metal aromatic coordination complex of barium oxobiscatecholatotitanate in which portions of the barium ions are replaced by strontium ions and portions of the titanium ions are replaced by zirconium ions precipitates and is collected on a filter. Note that there is an undetermined amount of added molecules (methanol and/or water) that form part of the complex. The formula for this resulting mixed metal aromatic coordination complex is shown in FIG. 5.

Calcining the mixed metal coordination complex illustrated in FIG. 5 at elevated temperatures, such as 700°-900° C., results in the formation of a substituted barium titanate having the general formula illustrated in FIG. 5.

Example 7, set forth below, is based upon the schematic illustration of FIG. 5. Although titanium tetrachloride was employed as a source of the titanium ions in the illustration of FIG. 5, other titanium salts could also be employed. These include other titanium halides, nitrates, carbonates, etc. The requirements for the compounds serving as the source of titanium ions are that they be soluble in the solvent employed; that they react with the catechol to form a coordination complex; and that the anions of the reactants can be expelled during the synthesis so that they will not appear in the product.

Similarly, other compounds of barium could serve as suitable sources of barium as long as such compounds are soluble under the reaction conditions and react with the titanium complex. Examples include barium nitrates, carbonates, perchlorates, halides, etc.

Figure 6:
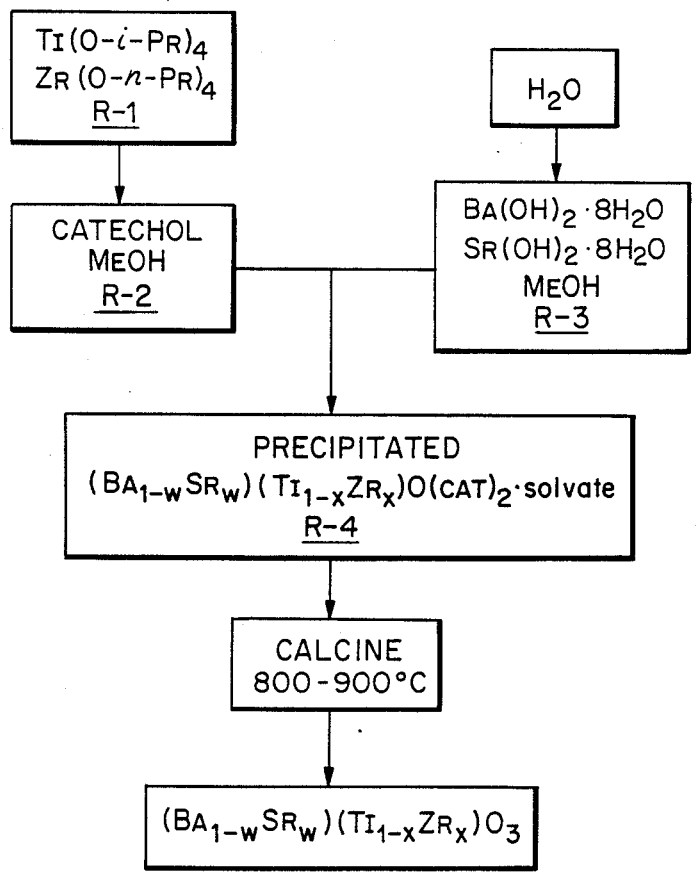
FIG. 6 is a flow diagram illustrating an alternative embodiment of a process according to this invention for preparing a substituted mixed metal aromatic coordination complex.

FIG. 6 illustrates schematically an alternate synthesis for a substituted mixed metal aromatic coordination complex, namely a barium titanate partially substituted with strontium and zirconium. Titanium tetraisopropoxide and zirconium tetra-n-propoxide are added to a methanol solution of catechol. Since a methanolic solution of the catecholate is obtained, there is no need to raise the pH with ammonia. The solution is neutral. However, this solution should be used within about one half hour to minimize the occurrence of an undesirable precipitate which could upset the stoichiometry of the catecholate. Separately, a methanol solution of barium hydroxide octahydrate and strontium hydroxide octahydrate is prepared and water is added. The two methanol solutions are then combined in a stirred precipitator resulting in a barium oxobiscatecholatotitanate in which a portion of the barium ions are replaced with strontium ions and a portion of the titanium ions are replaced with zirconium ions. Increased amounts of water increases the rate and amount of precipitation of the substituted mixed metal complex and can affect the particle size and porosity of the $ABO_3$ product.

The barium oxobiscatecholatotitanate produced can be calcined at elevated temperatures, such as 800°–900° C., to form the substituted barium titanate compound illustrated.

The process illustrated in FIG. 6 was employed in Example 8, below.

Figure 7:
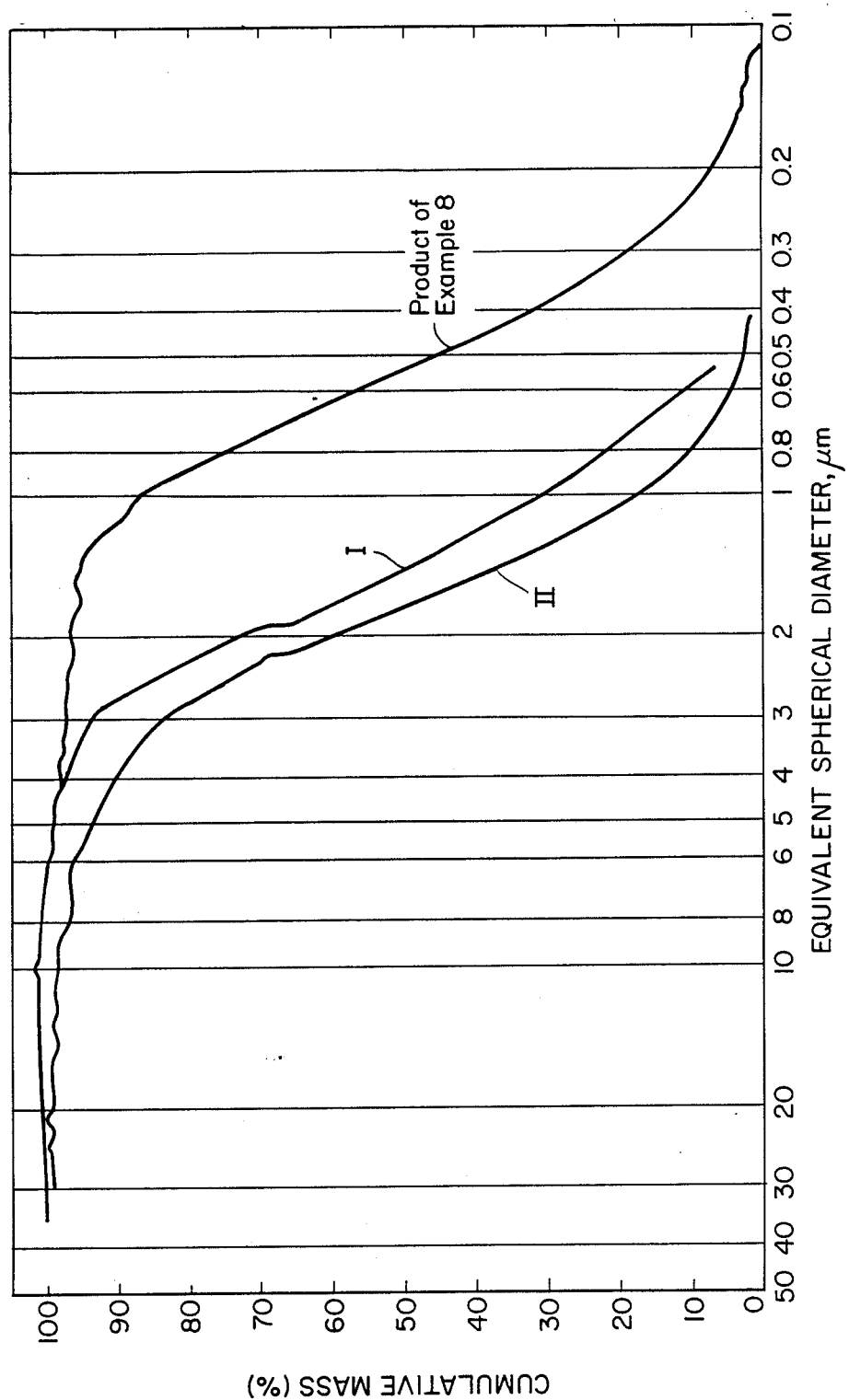
FIG. 7 is a sedigraph comparing the particle size distribution of barium titanate powder prepared in Example 8 below with that of commercially available barium titanate powders.

A particular advantage of the precursor materials produced according to this invention is the fine and uniform particle size which can be obtained in the ultimate $ABO_3$ compound. Pure crystals of the product form crystallites of 1000–3000 Å when heated. When these are placed in an air jet mill, submicrometer particle sizes can be obtained after one pass. This is illustrated in the sedigraph of FIG. 7. The three particle size distribution curves were obtained employing a Micromeritics SediGraph 5000 ET Particle Size Analyzer. This analysis is based on sedimentation theory and calculations were made according to Stokes law. Aqueous dispersions of the sample powders were prepared by stirring them into a Darvan® C solution (5 drops/40 ml water) and sonicating at 50 watts for 1½ minutes.

Figure 8:
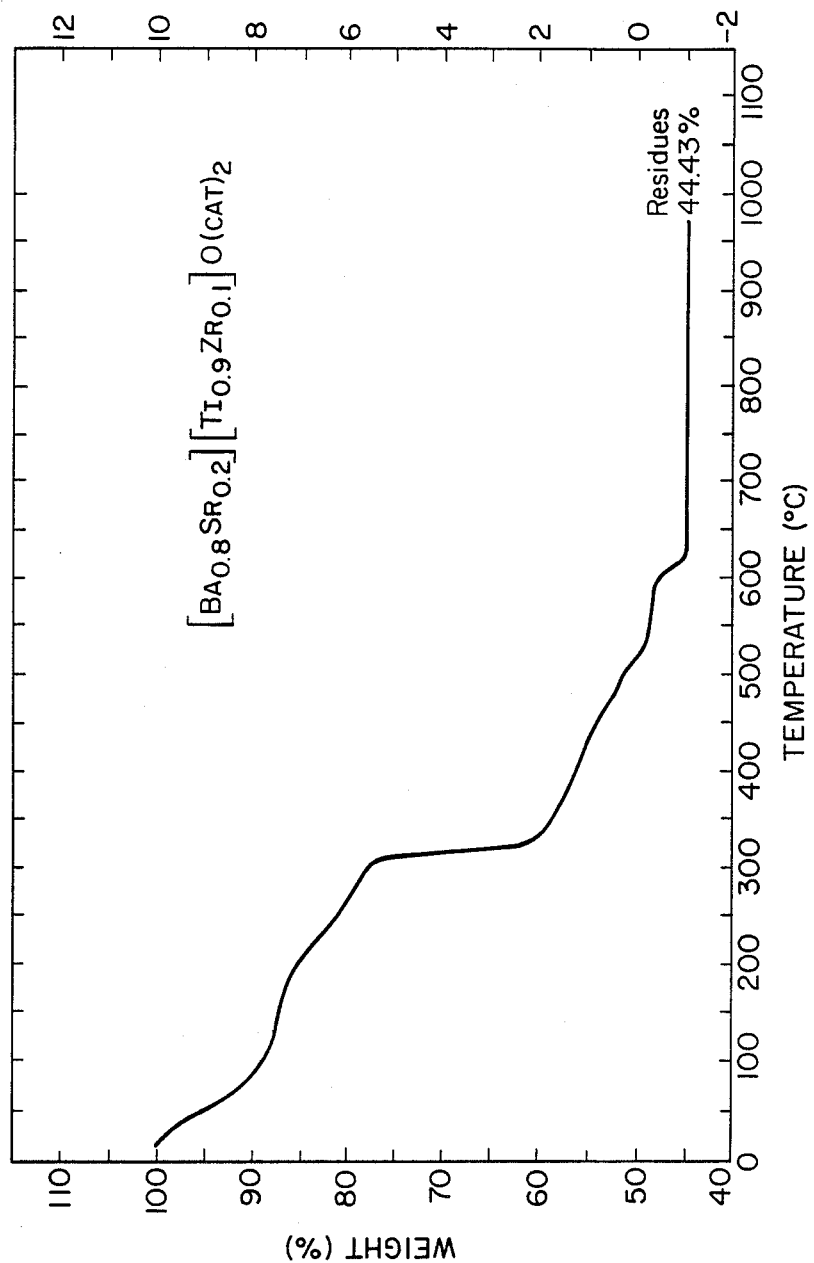
FIG. 8 is a plot resulting from TGA of the mixed metal coordination complex prepared in Example 8 below.

FIG. 8 is a TGA plot of the biscatecholate product of Example 8. The sample was dried in vacuum at 100° C. and allowed to equilibrate at atmospheric humidity. The dried sample was heated in air at 4° C./minute. Up to ~200° C. water (~3.5 equivalents) was lost (14% weight change). The weight loss (~41%) between 200° C. to 625° C. can be attributed to 2 equivalents of phenol. The resultant $ABO_3$ compound gave a residue value of 44.4%.

Preferred $ABO_3$ ceramic powders produced by this method have an average particle size between about 0.3 and about 0.8 microns. Particles below about 0.8 microns are fine enough to provide for facile sintering but particles below about 0.3 microns have too high a surface area for convenient fabrication. Particle size is determined by sedimentation according to Stokes law.

The mixed metal coordination complexes described herein typically have particle sizes of about 10 to 50 microns. This makes it easy to filter such complexes. The particle size shrinks during calcination by about 50% and can be further reduced by jet milling, etc., to the preferred range.

The preferred compositions also have a narrow particle size distribution, i.e., 80% of the mass of the particles falls between about 0.2 and about 1.3 microns.

Particularly preferred compositions also have high dielectric constants and low dissipation loss factors. Thus, the particularly preferred compositions have a dielectric constant above about 25,000 at a temperature in the range of from about −55° C. to about 125° C. and a dissipation factor below about 2.5% at room temperature.

The methods set forth herein are useful in preparing mixed metal coordination complexes, doped or undoped, which are precursors for perovskite powders and other $ABO_3$ compounds. Such powders are useful for tape casting in multilayer capacitor production. The materials are also useful in thermistors and other applications because of their high dielectric constants, ferroelectric properties and piezoelectric properties.

The invention will now be further illustrated with the following specific examples. All parts and percentages are by weight unless otherwise specified.

EXAMPLE 1

Catechol (402.99 g; 3.66 mol) and absolute methanol (8000 ml) were added to a 12-liter, 5-neck round bottom flask with a condenser attached. All of the catechol readily dissolved endothermically. This methanolic solution was degassed and filled with argon. From a dry box, 95% titanium tetraisopropoxide (360 g; 353 ml; 1.20 mol) was measured into a dropping funnel and then added at a moderate rate (constant stream) to the stirring catechol solution. During the addition (2–2.5 min.), the temperature of the reaction rose 4° C. (20° C.–24° C.) and precipitation of crystals from the deep red reaction solution commenced. Anhydrous ammonia was sparged into the colored reaction mixture at a rate of ~2.5 g/min. After 2.5 hours, all crystals dissolved and the addition of ammonia was stopped. During the addition of the ammonia (~375 g; 22 mol), the temperature of the reaction rose 13° C. (24° C.→37 C). An absolute methanol solution of barium hydroxide octahydrate (380.7 g; 1.20 mol in 3000 ml) was degassed and blanketed with argon. A small amount of insoluble barium carbonate was filtered off under an argon atmosphere and the clear hydroxide solution siphoned via a 0.125 inch stainless steel cannular tube to the stirring red ammoniated titanium catecholate solution. After 22 minutes, the hydroxide solution was completely added lowering the temperature of the reaction by 7° C. (37° C.→30° C.). A precipitate formed which was allowed to stir for 1 hour.

The reaction mixture (~12 liters) was then transferred by siphoning via a 0.125 inch stainless steel cannular tube to a 2-liter Schlenk filter flask. The filtering was a one hour operation. The filtered precipitate was pumped dry overnight to give 759.0 g of a reddish-brown crystalline material (methanolic barium triscatecholatotitanate). A sample was heated in a muffle furnace to 700° C. for 2 hours to give a white crystalline $BaTiO_3$ Its weight was 35.26% of the solvated barium triscatecholatotitanate. Based on barium and titanium, the yield was 95.8%.

TGA, TGA-MS and elemental analysis indicated that the precipitated material obtained in the preceding paragraph contained methanol. Single crystal x-ray analysis determined the structure to be pentamethanol barium triscatecholatotitanate. X-ray powder diffraction recorded a change in the crystal structure upon air drying. X-ray powder diffraction analysis of the material obtained by calcination of the catecholate complex at or above 600° C. proved the material to be $BaTiO_3$. The stoichiometry, as determined by wet chemical analysis, was 1.002±0.002 Ba:Ti. X-ray line broadening, surface area and transmission electron microscopy indicated that the ultimate particle size was submicrometer.

EXAMPLE 2

A degassed 35 ml solution of 9.87 g (0.089 mol) catechol in absolute methanol was anaerobically mixed with 12.00 g (0.040 mol) of 95% titanium tetraisopropoxide. The resultant red-colored solution was filtered under inert conditions and the frit washed with 10 ml of methanol to remove negligible precipitates. A degassed solution of 12.65 g (0.040 mol) barium hydroxide octahydrate in 100 ml absolute methanol was anaerobically filtered to remove barium carbonate. Via cannular tubes, the two reactant solutions were added simultaneously to 3 liters of stirring degassed absolute methanol in a 5-liter round bottom flask. The barium hydroxide solution was added at a rate twice as fast as the titanium/catechol solution. After an induction period of 20 to 80 minutes, a red precipitate formed. Anaerobic filtration collected 5.92 g (27% yield) of a red crystalline solvated barium triscatecholatotitanate. To the filtrate (3150 ml) was added anaerobically one liter of deaerated water. An orange/yellow precipitate formed to yield 10.82 g (50% yield) of solvated barium oxobiscatecholatotitanate. Aerobic calcination of either the triscatecholatotitanate or oxobiscatecholatotitanate at 600° C. produced $BaTiO_3$.

EXAMPLE 3

The procedure of Example 2 was employed except that the titanium catecholate and barium hydroxide solutions prepared were added simultaneously to only 30 ml of stirring degassed absolute methanol in a 250 ml round bottom flask. Within one quarter of the addition time, an orange precipitate formed. Stirring was continued overnight with subsequent filtering (anaerobically), washing with methanol, and then vacuum drying which produced 18.62 g (85% yield based on barium and titanium) of an approximately 7:3 ratio of barium triscatecholatotitanate/barium oxobiscatecholatotitanate mixture. Calcination of this material above 600° C. produced pure $BaTiO_3$.

EXAMPLE 4

Catechol (13.4 g; 0.122 mol) and absolute methanol (270 ml) were added to a 500-ml 3-neck round bottom flask with a condenser attached. This methanolic solution was degassed and filled with argon.

From a dry box, 95% titanium tetraisopropoxide (12 g; 0.040 mol) was measured into a dropping funnel and added at a moderate rate to the stirring catechol solution. Crystals precipitated from the deep red reaction solution. Anhydrous ammonia was bubbled into the colored reaction mixture for 15 min redissolving the precipitate. The addition of ammonia was exothermic to the point of reflux.

Under argon, 4.02 g (0.019 mol) of strontium nitrate was dissolved in 6 ml of degassed water and added via a 0.125 inch stainless steel cannular tube to 127.5 ml of the stirring red titanium catecholate (0.019 mol) solution. Within minutes yellow-brown, needle-like crystals precipitated which were allowed to stir for ~1 hour. The crystals were collected by anaerobic filtration, washed with degassed methanol, and pumped dry overnight yielding 6.86 g (75%) of strontium triscatecholatotitanate-1-water. Calcination of this material at temperatures greater than 750° C. produced $SrTiO_3$ as confirmed by an x-ray powder diffraction pattern.

Alternate Method of Adding Strontium Nitrate:

Under argon, 4.02 g (0.019 mol) of strontium nitrate was added to 127.5 ml of the stirring red titanium catecholate solution. The mixture was allowed to stir overnight. The next day the fine, powdery precipitate was filtered in a Schlenk filter flask and the precipitate pumped dry overnight to yield 8.85 g (97%) of a red-brown crystalline material which was strontium triscatecholatotitanate-1-water.

EXAMPLE 5

Titanium tetraisopropoxide (12.00 g; 0.040 mol) was added anaerobically to a deaerated solution of salicylic acid (16.97 g; 0.121 mol) in 100 ml of absolute methanol. Ammonia was bubbled through the orange solution and continued for 12 minutes after it reached spontaneous reflux. Via a 0.125 inch stainless steel cannular tube, the ammoniated titanium salicylate solution was added to a deaerated, ammonia-saturated, filtered solution of 12.72 g (0.040 mol) barium hydroxide octahydrate in 110 ml of absolute methanol. A yellow precipitate was filtered and washed with methanol. After air drying overnight, there was obtained 4.70 g (24%) of solvated barium oxobismethoxosalicylatotitanate. Calcination of this material above 720° C. produced $BaTiO_3$.

EXAMPLE 6

To 5.52 g (0.04 mol) of salicylic acid in absolute methanol (33 ml) was added 6.12 g (0.020 mol) of 95% titanium tetraisopropoxide. An orange precipitate was redissolved by adding 60 ml of methanol. A filtered solution of 6.30 g (0.020 mol) of barium hydroxide octahydrate in 125 ml of water was added to the orange titanium salicylate solution, and instantly, a precipitate formed which was filtered and air dried to yield 6.04 g (89% based on titanium) of barium oxobissalicylatotitanate. Calcination of this material above 1300° C. produced $BaTi_2O_5$. Upon standing, the filtrate of barium oxobissalicylatotitanate grew orange crystals of solvated barium trissalicylatotitanate. Calcination of the trissalicylatotitanate above 700° C. produced $BaTiO_3$.

EXAMPLE 7

A solution of $TiCl_4$ (161.25 g; 0.85 mol) in 157 ml of toluene and zirconium tetra-n-propoxide-propanol (63.35 g; 0.15 mol) in 190 ml of toluene were simultaneously pumped at a rate of 150 ml/hr through a static mixer into a refluxing solution of catechol (225 g; 2.05 mol) in 500 ml of toluene. Vigorous mechanical stirring is necessary for mixing. Addition takes 105 minutes; the reaction continues at reflux for 4.3 hours. Two hundred milliters of solvent (n-propanol/toluene) is distilled from the reaction to drive the reaction to completion. Red-brown powder is filtered and dried under vacuum at 95° C. to yield 244.22 g of $Ti_{0.89}Zr_{0.11}(catecholate)_2$ A filtered, anaerobic solution of barium hydroxide octahydrate (208.22 g; 0.66 mol) and strontium hydroxide octahydrate (37.25 g; 0.14 mol) in 2240 ml of methanol, and a solution of $Ti_{0.89}Zr_{0.1}(catecholate)_2$ (227.76 g; 0.80 mol) in 2300 ml of methanol (dissolved by sparging 210 liters of ammonia through the solution) were pumped at a rate of 249 and 284 ml/min, respectively, through a 0.25 inch static mixer. This stream was added to a flow (86 ml/min) of anaerobic, deionized water and mixed in a 0.25 inch static mixer. Total process time was 9 minutes. The collected, orange slurry was stirred for one hour, filtered and dried under vacuum at 96° C. yielding 326.2 g of solvated $Ba_{0.82}Sr_{0.18}Ti_{0.90}Zr_{0.10}(catecholate)_2$. The catechol was burned off at 500° C. for 19 hours followed by calcination at 870° C. for 14 hours. The yield of $Ba_{0.82}Sr_{0.18}Ti_{0.90}Zr_{0.10}O_3$ was 163 g with a surface area of 11.5 $m^2/g$. X-ray analysis shows the powder diffraction pattern of perovskite.

EXAMPLE 8

This synthesis was performed as illustrated in FIG. 6. Barium hydroxide octahydrate (21.2 lb; 29.4 mol), strontium hydroxide octahydrate (3.7 lb; 4.8 mol), methanol (167.6 lb, 25.4 gal) and water (39.7 lb; 4.75 gal) were added to a 50-gal reactor (R-3). The contents of R-3 were stirred at 25° C. and cycled through an in-line filter to separate insoluble carbonates.

Another 50-gal reactor (R-1) was charged with titanium tetraisopropoxide (18.2 lb; 21.9 mol; 2.3 gal) and zirconium tetra-n-propoxide-propanol (5.1 lb; 5.2 mol; 0.58 gal), and these were stirred together. In a 20-gal, glass-lined reactor (R-2) maintained at 25° C., catechol (17.5 lb; 72.4 mol) was dissolved in methanol (59.7 lb; 9.07 gal). The contents of R-1 were added to R-2. Within 15 minutes of mixing the reactor contents of R-2, pumps to R-2 and R-3 were activated to charge a 50-gal glass-lined reactor (R-4) in 2 minutes. After 0.5 hour of stirring in R-4, the precipitated [$Ba_{0.82}Sr_{0.18}$][$Ti_{0.90}Zr_{0.10}$]O (catecholate)2 solvate product was filtered into an enclosed pressure vessel collecting 73.5 lb of compressed, orange-colored wet cake.

The catecholate cake was dried for 1 to 2 hours and then placed in alumina trays for calcination. The cake was calcined according to the following schedule:

| Ramp Rate (°C./hr) | | Temperature (°C.) | | Dwell (hours) |
|---|---|---|---|---|
| 6.0 | to | 100 | | — |
| 120.0 | to | 220 | hold for | 1.0 |
| 6.0 | to | 290 | hold for | 2.0 |
| 6.0 | to | 350 | hold for | 0.5 |
| 120.0 | to | 470 | hold for | 0.5 |
| 120.0 | to | 605 | hold for | 0.5 |
| 60.0 | to | 650 | | — |
| 300.0 | to | 1000 | hold for | 3.0 |
| −300.0 | to | 100 | | END. |

The resulting [$Ba_{0.82}Sr_{0.18}$][$Ti_{0.90}Zr_{0.10}$]$O_3$ powder was comminuted by ball milling to a particle size distribution of 90% of the particles less than 0.96 micron, 50% less than 0.54 micron and 20% less than 0.3 micron.

FIG. 7 is a sedigraph illustrating the particle size distribution of calcined powder produced in this example after jet milling. The mill employed was a spiral design and was lined with tungsten carbide. The particle size distribution of powder from this example was determined after one pass through the mill at a feed rate of 6–7 lb/hour. Particle size distributions for two commercially available barium titanate powders marketed by Tam Ceramics, Inc. are also shown for comparison. The first product is Ticon ® HPB (I) and the second is Tamtron ® Z5U502L (II).

Electrical properties of powder produced by this example and ball milled were tested according to MIL-STD-202for as 'Z5U' composition (i.e., 1 kHz at 0.3 vrms over a temperature range of +10° C. to 85° C.). Samples for these measurements were prepared by dry pressing pellets at 20 kpsi and subsequent sintering at approximately 1400° C. for 2 hours, thus forming a dense disk of thickness t and diameter D. The dielectric constant (K) is calculated from the equation:

$$K = Ct/AEp$$

where:
C = capacitance (farad)
A = area = 25*PI*(D)A2 ($m^2$)
Ep = 8.85E-12 (farad/meter)

Figure 9:
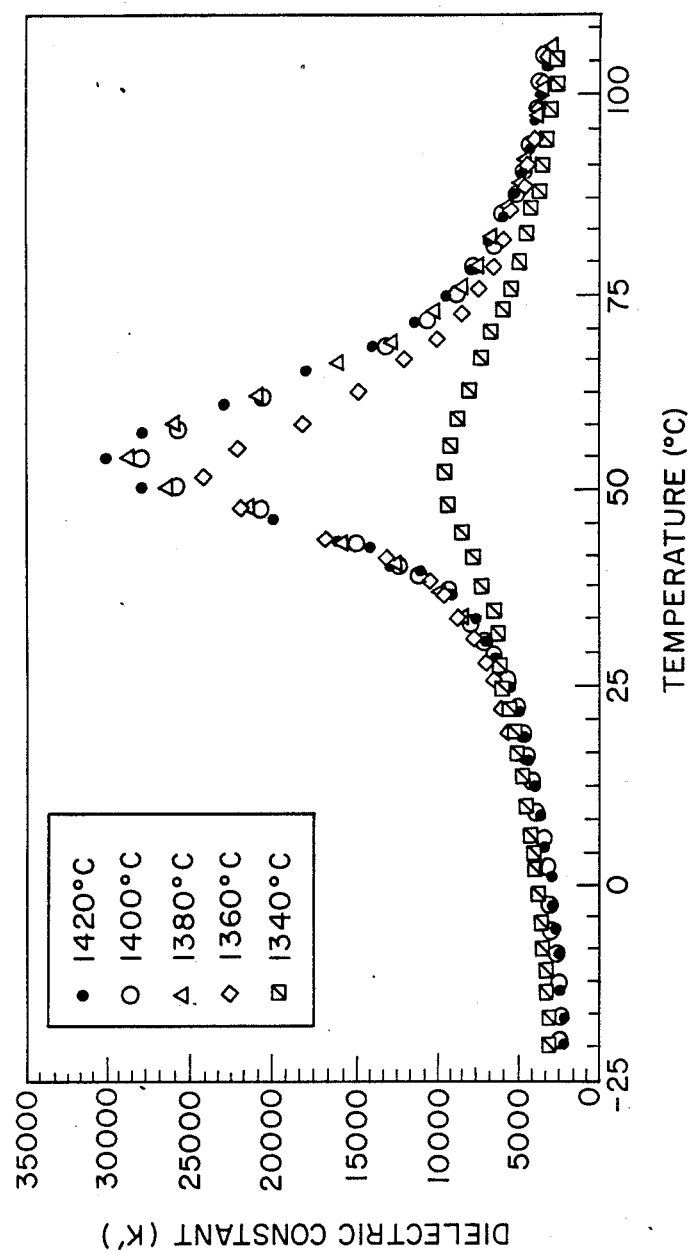
FIGS. 9 and 10 are plots of the dielectric constants and dissipation factors, respectively, at varying sintering temperatures for substituted mixed metal $ABO_3$ compounds prepared according to Example 8.
Figure 10:
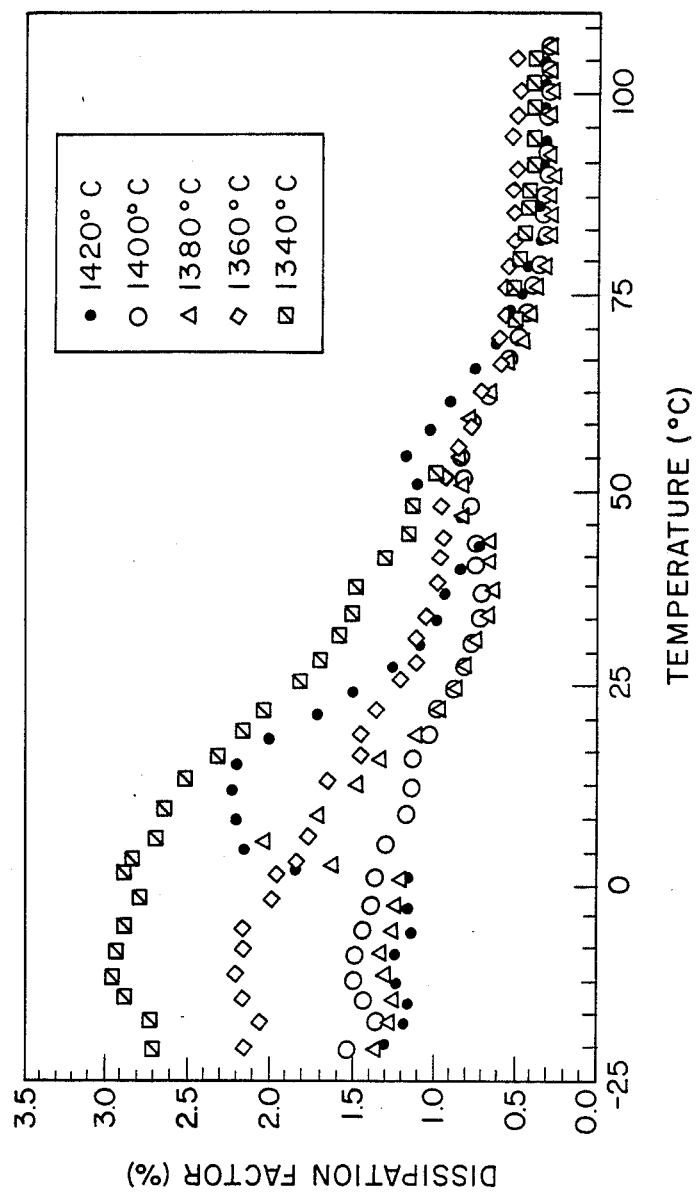

The effect of sintering temperature on the dielectric constant and dissipation factor is illustrated in FIGS. 9 and 10, respectively. The data are illustrative of the high dielectric constants and low dissipation factors which can be achieved in powders of this invention.

EXAMPLE 9

A degassed 2.5 ml solution of 0.3005 g (1.27 mmol) calcium nitrate tetrahydrate in absolute methanol was anaerobically added to a solution of catechol (17.34 g; 157.48 mmol) in absolute methanol (75 ml). The resultant solution was added anaerobically to a homogeneous mixture of titanium tetraisopropoxide (18.12 g; 64 mmol) and zirconium tetra-n-propoxide-propanol (4.75 g; 11 mmol).

A degassed solution of barium hydroxide octahydrate (8.24 g; 26.1 mmol) and strontium hydroxide octahydrate (0.6572 g; 2.2 mmol) in 189 ml of absolute methanol was prepared and stirred for 1 hour. An immeasurable amount of insoluble carbonates was filtered from the solution.

Both the catecholate and hydroxide solutions were simultaneously poured with stirring into a 800-ml beaker. Within 3 to 5 minutes there precipitated an orange solid. After standing for 2 weeks, 0.1 g of a precipitate was filtered. An elemental analysis showed the filtered product to be the substituted triscatecholatotitanate of the formula

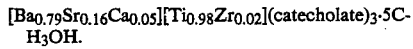

[$Ba_{0.79}Sr_{0.16}Ca_{0.05}$][$Ti_{0.98}Zr_{0.02}$](catecholate)$_3$·5C-$H_3OH$.

EXAMPLE 10

Solid tin tetraisopropoxide-isopropanol (1.66 g; 0.004 mol), liquid titanium tetraisopropoxide (16.99 g; 0.06 mol), and liquid zirconium tetra-n-propoxidepropanol (4.75 g; 0.011 mol) were mixed in the dry box and stirred into a solution. This alkoxide solution was added with stirring to a degassed methanolic solution of catechol (17.34 g; 0.157 mol/75 ml) which turned to a dark brown.

A degassed solution of barium hydroxide octahydrate (19.40 g; 0.0615 mol) and strontium hydroxide octahydrate (3.59 g; 0.0135 mol) in 189 ml of absolute methanol was prepared and stirred for 1 hour. To this hydroxide mix was added 39.5 ml of degassed distilled water. The insoluble carbonates were then filtered anaerobically.

Both the catecholate and hydroxide solutions were simultaneously poured with stirring into an 800-ml beaker. Within 1 minute, an orange solid precipitated. The reaction mixture was allowed to continue stirring for 1 hour, filtered, and left to dry in a vacuum oven at 100° C. overnight to give 22.77 g of a substituted oxobiscatecholatotitanate powder.

Calcination (5° C./min→1000° C.; 1000° C./12 hr) produced 12.06 g of a white ceramic oxide powder having the formula [$Ba_{0.85}Sr_{0.15}$][$Ti_{0.93}Zr_{0.06}Sn_{0.01}$]$O_3$. X-ray analysis showed the powder diffraction pattern of a single phase perovskite material.

EXAMPLE 11

Methanolic ammonium triscatecholatostannate (1.46 g; 0.0029 mol) was dissolved in 54 ml of methanol to which, in turn, was added catechol (10.87 g; 0.0984 mol).

Titanium tetraisopropoxide (12.16 g; 0.0429 mol) and zirconium tetra-n-propoxide-propanol (3.40 g; 0.0079 mol) were mixed in the dry box and stirred into a solution. This alkoxide solution was added with stirring to the above prepared catecholate solution. There was obtained a dark brown solution which was allowed to continue stirring for 1 hour without any signs of precipitation.

A degassed solution of barium hydroxide octahydrate (13.88 g; 0.0440 mol) and strontium hydroxide octahydrate (2.57 g; 0.0099 mol) in 135 ml of absolute methanol was prepared and stirred for 1 hour. To this hydroxide mix was added 28 ml of degassed distilled water. The insoluble carbonates were then filtered anaerobically.

Both the catecholate and hydroxide solutions were simultaneously poured with stirring into an 800-ml beaker. Within 1 minute there precipitated an orange solid. The reaction mixture was allowed to continue stirring for 1 hour, filtered, and left to dry in a vacuum oven at 100° C. overnight to give 12.06 g of a substituted oxobiscatecholatotitanate powder.

Calcination (5° C./min→1000° C./12 hrs) produced 8.74 g of a white ceramic oxide powder having the formula $[Ba_{0.82}Sr_{0.18}][Ti_{0.92}Zr_{0.07}Sn_{0.01}]O_3$. X-ray analysis shows the powder diffraction pattern of a single phase perovskite material.

EXAMPLE 12

A degassed 7.4 ml solution of 0.89 g (0.0038 mol) of calcium nitrate tetrahydrate in absolute methanol was anaerobically added to a solution of catechol (17.34 g; 0.157 mol) in absolute methanol (75 ml). To this resultant solution was added anaerobically a homogeneous mixture of titanium tetraisopropoxide (18.12 g; 0.064 mol) and zirconium tetra-n-propoxide-propanol (4.75 g; 0.011 mol).

A degassed solution of barium hydroxide octahydrate (18.22 g; 0.0577 mol) and strontium hydroxide octahydrate (3.59 g; 0.0120 mol) was prepared and stirred for 1 hour. An immeasurable amount of insoluble carbonates was filtered from the solution. Both the catecholate and hydroxide solutions were simultaneously poured with stirring into a 800 ml-beaker. Within 1 minute there appeared an orange precipitate and stirring continued for 30 minutes. On filtering and drying in vacuum at 100° C. overnight, elemental analysis showed we obtained 21.16 g of a substituted oxobiscatecholatotitanate precursor.

Calcination (5° C. min→1000° C.; 1000° C./12 hr) produced 10.96 g of a white ceramic powder having the formula $[Ba_{0.77}Sr_{0.17}Ca_{0.06}][Ti_{0.98}Zr_{0.02}]O_3$. X-ray analysis shows the powder diffraction pattern of a single phase perovskite material.

EXAMPLE 13

To a 4.3 ml solution of catechol (1.00 g; 0.0091 mol) in absolute methanol was added with stirring tin tetraisopropoxide-isopropanol (1.25 g; 0.0030 mol). A white precipitate appeared almost instantaneously and the mixture was allowed to continue stirring for 5 minutes. Ammonia was bubbled for 3 minutes into the mixture to give a solution. Crystallization was induced by evaporating the methanol. After filtering, the crystals were washed with hexane. Elemental analysis showed that approximately 1.05 g of solvated ammonium triscatecholatostannate was obtained. This complex can be represented by the formula $(NH_4)_2Sn(catecholate)_3 \cdot CH_3OH$.

EXAMPLE 14

To a 21.6 ml solution of catechol (5.00 g; 0.0454 mol) in absolute methanol was added, with stirring, 83.2 g of 11.3% isopropanol solution of tin tetraisopropoxideisopropanol (9.40 g; 0.0218 mol). Ammonia was bubbled into the catecholate solution for 5 minutes and refrigerated overnight to induce crystallization. There was filtered a white solid which analyzed to be the solvated dimer of ammonium oxobiscatecholatostannate. This can be represented by the formula $(NH_4)_2 SnO(catecholate)_2 \cdot 4CH_3OH$.

Utility

The process of this invention is useful in preparing mixed metal coordination complexes which are useful as preferential chelating agents and as precursors to $ABO_3$ compounds. Preferential chelating agents can be used in selective metal separations, such as those employed in certain mining operations, and in selective metal detoxifications. $ABO_3$ compounds, such as perovskites, are useful in a wide variety of electrical, optical and electrooptical applications because of their unique properties (e.g., ferroelectric and piezoelectric properties).

Equivalents

Those skilled in the art will recognize, or be able to ascertain, using no more than routine experimentation, many equivalents to the specific embodiments of the invention described herein. These and all other equivalents are intended to be encompassed by the following claims.

We claim:

1. A substituted mixed metal aromatic coordination complex $[A \cdot Q_m][B(L)_n(Ar)_o]$ wherein A represents a first metal ion, B represents a second metal ion, Q represents a solvate, m represents the number of moles of Q, L represents oxygen or —OR wherein R can be hydrogen, saturated or unsaturated acyclic or cyclic alkyl, aryl or alkaryl, n is a number representing the moles of L, Ar represents a residue of a disubstituted aromatic compound, and wherein o represents the number of moles of Ar in the coordination complex with o being greater than zero and wherein a portion of the A ion or B ion, or both, is substituted with one or more additional metal ions.

2. A substituted mixed metal coordination complex of claim 1 wherein a portion of the A ion is substituted with one or more additional metal ions.

3. A substituted mixed metal coordination complex of claim 1 wherein a portion of the B ion is substituted with one or more additional metal ions.

4. A substituted mixed metal coordination complex of claim 2 wherein a portion of the B ion is substituted with one or more additional metal ions.

5. A mixed metal coordination complex of claim 1 wherein the A metal ion comprises a metal ion selected from Ba, Sr, Ca, Pb, Mg, La, Y, Bi, Nd, Pm, Sm, Eu, Gd, Tb, Dy, Ho, Er, Tm, Yb, Lu and Sc.

6. A mixed metal coordination complex of claim 1 wherein the B metal ion comprises a metal ion selected from Ti, Zr, Sn, Mn, Fe, Zn, Nb, W, Mg, Ta, Cu, Cr, Ru, Rh, Co, Hf, V, Sc, Mo and Ir.

7. A mixed metal coordination complex of claim 5 wherein the B metal ion comprises a metal ion selected from Ti, Zr, Sn, Mn, Fe, Zn, Nb, W, Mg, Ta, Cu, Cr, Ru, Rh, Co, Hf, V, Mo and Ir, and wherein the B metal ion can be Sc where the A metal ion is not Sc.

8. Solvated oxobiscatecholate.

9. Solvated oxobiscatecholate.

* * * * *

UNITED STATES PATENT AND TRADEMARK OFFICE
CERTIFICATE OF CORRECTION

PATENT NO. : 4,946,810

DATED : August 7, 1990

INVENTOR(S) : Robert H. Heistand, II and Lawrence G. Duquette

It is certified that error appears in the above-identified patent and that said Letters Patent is hereby corrected as shown below:

Column 5, line 11 "$Pb(Fe_{\frac{2}{3}}W_{\frac{1}{3}})O_3(Znl//0.16$" should correctly read -- $Pb(Fe_{\frac{2}{3}}W_{\frac{1}{3}})O_3/0.16$ --.

Column 10, line 12 "C.-24°" should correctly read --C→24°--.

Column 12, line 40 "$TiO\ 89Zr0.11(catecholate)2$" should correctly read --$Ti_{0.89}Zr_{0.11}(catecholate)_2$.---.

Column 12, line 45 "$TiO_{0.89}Zr_{0.1}(catecholate)2$" should correctly read -- $Ti_{0.89}Zr_{0.11}(catecholate)_2$ --.

Column 12, line 53 "$Zr_{0.10}$" should correctly read --$Zr_{0.100}$--.

Column 13, line 12 "(catecholate)2" should correctly read --(catecholate)$_2$--.

Column 13, line 50 "STD-202for as" should correctly read --STD-202 for a--.

Signed and Sealed this

Twenty-first Day of July, 1992

Attest:

DOUGLAS B. COMER

*Attesting Officer*   *Acting Commissioner of Patents and Trademarks*